United States Patent [19]
Sullivan

[11] 3,859,297
[45] Jan. 7, 1975

[54] METHOD FOR PREPARATION OF ORGANIC AZOLYL POLYSULFIDES

[75] Inventor: Alfred Bay Sullivan, Akron, Ohio

[73] Assignee: Monsanto Company, St. Louis, Mo.

[22] Filed: June 26, 1972

[21] Appl. No.: 266,458

Related U.S. Application Data

[63] Continuation-in-part of Ser. No. 880,893, Nov. 28, 1969, Pat. No. 3,705,923.

[52] U.S. Cl. ... 260/306.5, 260/256.5 R, 260/302 E, 260/302 F, 260/302 H, 260/302 S, 260/306.6 R, 260/306.7 T, 260/306.8 F, 260/307 D, 260/309.2
[51] Int. Cl. ............................................. C07d 91/48
[58] Field of Search ...... 260/306.5, 306.6 R, 307 D, 260/309.2, 302 S, 302 H, 302 E, 302 F, 306.7 T, 306.8 F, 256.5 R

[56] References Cited
UNITED STATES PATENTS
3,705,923  12/1972  Sullivan .......................... 260/306.5

*Primary Examiner*—Richard J. Gallagher

[57] ABSTRACT

A process for the preparation of organic azolyl polysulfides which comprises reacting a compound containing one or more -SH radicals with a sulfenamide characterized by the presence of a carbonyl group adjacent to the sulfenamide nitrogen wherein one or both of the SH compound and sulfenamide contains an azolyl moiety.

19 Claims, No Drawings

METHOD FOR PREPARATION OF ORGANIC AZOLYL POLYSULFIDES

This application is a continuation-in-part of application Ser. No. 880,893, filed Nov. 28, 1969 now U.S. Pat. 3,705,923, issued Dec. 12, 1972 relates to the manufacture of organic polysulfides from sulfenamides.

Organic polysulfides have a wide variety of commercial applications such as vulcanization accelerators or vulcanization agents in the curing of rubber and solvent or plasticizers for rubber or plastics. They may also be used as intermediates in the preparation of other organic compounds and as catalysts in addition reactions of olefinic unsaturated compounds. Certain ones are high pressure lubricants, while others biologically active, are useful as fungicides, insecticides, nematocides and bacteriocides.

It is known that symmetrical organic disulfides may be produced by reaction of an organic chloride with sodium disulfide, by catalytic oxidation of a mercaptan using hydrogen peroxide and cupric chloride catalyst; by the reaction of elemental sulfur in the presence of a Friedel-Crafts catalyst with dialkyl sulfide, or by reaction of a mercaptan with sulfur under basic conditions. It is difficult to produce pure disulfides from reaction with sulfur because of formation of polysulfides. A process for converting organo-sulfenyl chlorides to disulfides is also known. In all the above-mentioned processes only symmetrical disulfides can be produced.

Asymmetrical organic disulfides have been produced by heating a mixture of two different symmetrical disulfides in the presence of an alkali sulfide to effect disproportionation or by oxidizing a mixture of two different mercaptans using a metal phthalocyanine catalyst.

One advantage of the present process is that both symmetrical and unsymmetrical organic disulfides or trisulfides may be produced under mild reaction conditions in absence of any catalyst whatsoever. Neither oxidative reagent nor hydroxide is required. The only materials needed are two reactants hereinafter described.

A further advantage is that substantially quantitative yields of essentially pure disulfides and trisulfides are produced by simple procedures; while another is that polysulfides having a wide variety of radicals and physical properties may be prepared. By variation of two simple reactants, it is possible to produce polysulfides having the desired molecular weight, solubility, boiling point, toxicity, or other property desired. The process also may be used in the purification of sour petroleum fractions and as an analytical procedure. These and other advantages will become apparent as the description of the invention proceeds, for example, the ability to recycle the imide formed as a by-product of the reaction.

SUMMARY OF THE INVENTION

According to the present invention, organic polysulfides may be produced by reacting a compound containing one or more —SH radicals with a sulfenamide characterized by the presence of a carbonyl group adjacent to the sulfenamide nitrogen. The characteristic nucleus is

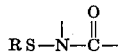

where the dangling valence on the nitrogen may be linked to a second carbonyl, alkyl, aryl, cycloalkyl, hydrogen, alkylene carbon or arylene carbon and R is alkyl, aryl, or cycloalkyl and the dangling valence on the carbonyl may be linked to alkyl, aryl, cycloalkyl, alkylene carbon or arylene carbon, and the unsatisfied dangling valences of nitrogen and carbonyl radicals are satisfied by forming a heterocyclic ring through a common alkylene or arylene radical.

Sulfenamides of this type are disclosed as prevulcanization inhibitors in the following patent applications; amide, imide and urea sulfenamides are disclosed in Ser. No. 714,445 filed Mar. 20, 1968 now U.S. Pat. No. 3,546,185 issued Dec. 8, 1970; sulfenamides derived from dimercaptans and the above imides are disclosed in Ser. No. 80,815, filed Oct. 14, 1970 which is a division of Ser. No. 704,186, filed Sept. 20, 1967 now abandoned; said application 704,186 is a division of Ser. No. 646,202, filed June 15, 1967 which through continuation application Ser. No. 697,615, Jan. 15, 1968 is now U.S. Pat No. 3,562,225 issued Feb. 9, 1971; cyclic urea sulfenamides are further disclosed in Ser. No. 696,123, filed Jan. 8, 1968 now U.S. Pat. No. 3,473,667 issued Oct. 21, 1969; and U.S. Pat. No. 3,427,319 issued Feb. 11, 1969; and also the thiosulfenamides are disclosed in Ser. No. 643,401, filed June 5, 1967 now U.S. Pat. No. 3,539,538 issued Nov. 10, 1970. All sulfenamides disclosed therein are hereby incorporated by reference into this application. All the amide, imide and urea sulfenamides disclosed are suitable for the practice of this invention.

Sulfenamides suitable for practice of this invention include compounds of the formula

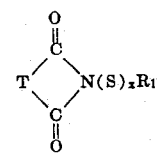

The reaction is represented by equation (I):

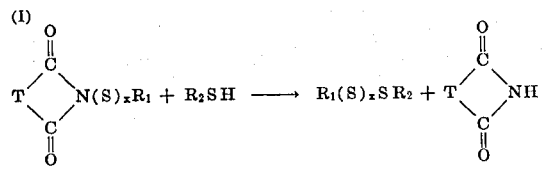

$R_1$ and $R_2$ individually are alkyl, cycloalkyl, aralkyl, alkenyl, aryl, alkaryl, acyl,

or benzothiazolyl and $x$ is one or two. The $R_1$ and $R_2$ radicals may contain substituents. Suitable substituents are chloro, bromo, fluoro, iodo, hydroxy, alkoxy or nitro, T represents (acyclic or cyclic) aliphatic, olefinic, or aromatic hydrocarbon divalent radicals. Examples of T are alkylene, alkenylene and arylene, such as phenylene.

If a symmetrical polysulfide is desired, then reactants containing similar $R_1$ and $R_2$ groups are selected, otherwise reactants having different $R_1$ and $R_2$ groups are selected. Both di- and trisulfides may be produced by the process. If a disulfide is desired, monothioimide, meaning that $x$ is one, is selected; when a trisulfide is desired, then a dithioimide, $x$ is two, is selected.

The process is a general one having exceedingly wide applicability. The particular carbonyl thioimide and the nature of the radical attached to —SH are not significant. It appears that all known mercaptans and carbonyl thioimides are useful for the practice of this invention. In general, any compound having one or more —SH groups as the only reactive substituent is a suitable reactant.

Bis($R_1$-polysulfides) may be made by using a dithiol (dimercaptan) instead of a simple mercaptan or by using a bis thioimide and a simple mercaptan. The equations for these reactions are illustrated thusly:

(II)

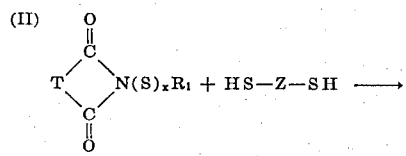

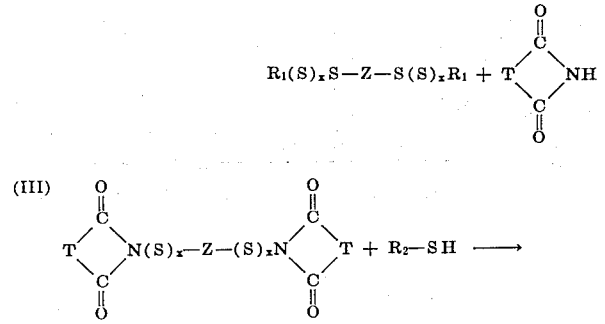

(III)

wherein $R_1$, T and $x$ have the same meaning as before. Z is a divalent radical derived by removal of two hydrogen atoms from (acyclic or cyclic) aliphatic, olefinic or aromatic hydrocarbons. Examples of Z are alkylene, cycloalkylene, alkenylene, cycloalkenylene or arylene. Lower alkylene of two to six carbon atoms or phenylene are the preferred radicals.

The preferred process for the preparation of organic polysulfides comprises reacting a thioimide of the formula:

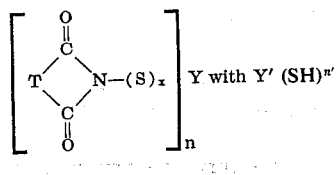

where T is alkylene, cycloalkylene, alkenylene, cycloalkenylene, or arylene, and $n$, $n'$ and $x$ are one or two; when $n$ and $n'$ are one, Y and Y' individually are

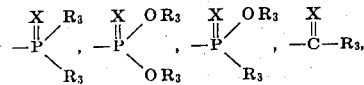

benzothiazolyl or —$R_3$ where $R_3$ is alkyl, cycloalkyl, aralkyl, alkenyl, aryl, or alkaryl; X is oxygen or sulfur; when $n$ or $n'$ is two, Y or Y' respectively is selected from the group represented as T.

The term alkyl means any monovalent radical derived from an aliphatic saturated hydrocarbon by the removal of one hydrogen atom. Their general formula is $C_nH_{2n+1}$. The alkyl radical may be primary, secondary, or tertiary, and any carbon chain attached to the carbon from which the hydrogen is removed may be branched or unbranched. Alkyl radicals of 1–20 carbon atoms are suitable. Lower alkyl radicals of 1–10 carbon atoms are preferred. Cycloalkyl radicals are aliphatic cyclic hydrocarbons of the series $C_nH_{2n-1}$. The preferred cycloalkyl radicals contain 5–8 carbon atoms in the ring but cycloalkyl radicals of 3–12 carbon atoms are suitable. Aralkyl radicals are univalent alkyl radicals having an aryl radical attached to the aliphatic hydrocarbon chain. Preferred aralkyl radicals are benzyl, 1-phenethyl, 2-phenethyl, 2-phenylpropyl and 2-phenyl-2-propyl.

Alkenyl means a monovalent radical derived from an aliphatic unsaturated hydrocarbon by the removal of one hydrogen atom. Alkenyl belongs to the series $C_nH_{2n-1}$ and contains one double bond. Lower alkenyl radicals of 3–10 carbon atoms are preferred. Cycloalkenyl is a monovalent radical derived from an aliphatic cyclic unsaturated hydrocarbon by the removal of one hydrogen atom. Cycloalkenyl belongs to the series $C_nH_{2n-3}$ and contains one double bond. Lower cycloalkenyl radicals of 5 to 8 carbon atoms are preferred.

Aryl is a monovalent organic radical, the free valence of which belongs to an aromatic carbocyclic nucleus and not to a side chain. Phenyl, naphthyl and anthracenyl are examples. Alkaryl radicals are aryl radicals as described having lower alkyl radicals attached to the carbocyclic chain, examples of which are tolyl, xylyl, cumenyl and p-t-butylphenyl.

Acyl is an organic radical derived from an organic acid by removal of the hydroxyl group. This radical may be represented by the formula

where X is sulfur or oxygen and A is alkyl, aralkyl, cycloalkyl, aryl or alkaryl. A is preferably aryl, for example, benzoyl.

The term alkylene means any divalent radical derived from an aliphatic saturated hydrocarbon by the removal of two hydrogen atoms and has the general formula $C_nH_{2n}$. Lower alkylene radicals of 2–6 carbon atoms are preferred. Cycloalkylene is a divalent radical derived by removal of an additional hydrogen atom from a cycloalkyl radical. The general formula for cycloalkylenes is $C_nH_{2n-2}$. Cycloalkylenes of 5–8 carbon atoms are preferred.

Alkenylene means a divalent radical derived from an aliphatic unsaturated hydrocarbon by the removal of two hydrogen atoms. Alkenylene belongs to the series $C_nH_{2n-2}$ and contains one double bond. Lower alkenylene radicals of 2 to 10 carbon atoms are preferred. Cycloalkenylene means a divalent radical derived from removal of an additional hydrogen atom from a cycloalkenyl radical. The general formula for cycloalkenylenes is $C_nH_{2n-4}$ and contains one double bond. Lower cycloalkenylenes of 5 to 8 carbon atoms are preferred.

T is a divalent radical derived from the removal of two hydrogen atoms from (acyclic or cyclic) saturated aliphatic, olefinic, or aromatic hydrocarbon. The radicals are alkylene, aralkylene, cycloalkylene, alkenylene, cycloalkenylene, arylene, and alkarylene. Examples of such radicals are ethylene, propylene, butylene, amylene, hexylene, octylene, cyclobutylene, cyclopentylene, cyclohexylene, cyclooctylene, vinylene, propenylene, phenylene, and naphthylene. The heterocyclic radical made by the T group along with the two carbonyl groups and the nitrogen atom is an imido radical. Examples of such imido radicals are succinimidyl, glutarimidyl, adipimidyl, phthalimidyl, maleimidyl and hydrophthalimidyl.

One class of disulfides produced by the subject process is characterized by at least one of the radicals attached to sulfur being azolyl or substituted azolyl with benzothiazolyl being a preferred azolyl radical.

Specific examples of $R_1$ and $R_2$ are methyl, ethyl, propyl, isopropyl, butyl, isobutyl, sec-butyl, tert-butyl, amyl, hexyl, octyl, decyl, dodecyl, hexadecyl, eicosyl, cyclopentyl, cyclohexyl, cyclooctyl, cyclododecyl, benzyl, cumenyl, phenethyl, vinyl, phenyl, allyl, naphthyl, anthracenyl, 1-butenyl, 2-butenyl, pentenyl, hexenyl, tolyl, xylenyl, diethylphenyl, ethyltolyl, acetyl, benzoyl, toluyl, dimethoxyphosphoryl, dimethoxythiophosphoryl, diethoxyphosphoryl, diethylthiophosphoryl, dibutoxyphosphoryl, dimethylphosphoryl, dimethylthiophosphoryl, diethylphosphoryl, methylphenylphosphoryl, methylethylphosphoryl, ethylphenylphosphoryl, and 2-benzothiazolyl.

Examples of $R_1$ and $R_2$ when the radicals have substituents are 2-chloroethyl, 2-hydroxyethyl, 2-chloropropyl, 3-chloropropyl, 4-bromobutyl, 4-chlorophenyl, 2-bromophenyl, p-bromobenzyl, 3-chloropropenyl, 5-chloro(2-benzothiazolyl), 6-ethoxy(2-benzothiazolyl), 4-fluorocyclohexyl, 3-chlorocyclohexyl, 5-nitro(2-benzothiazolyl), and 4-nitrophenyl.

Other azoles and nuclear substituted azoles besides benzothiazoles which are suitable for Y and Y' are 2-benzothiazolyl, 2-benzoxazolyl, 2-benzimidazolyl, 2-thiazolyl, 2-thiazolinyl, 2-naphthathiazolyl, 2-(4,5,6,7-tetrahydro)benzothiazolyl, and s-triazolo [3,4-b]benzothiazol-3-yl and said azoles substituted by chloro, bromo, fluoro, iodo, hydroxy, alkoxy, nitro, lower alkyl, acetyl, lower alkyl carboxyl, acetoxy, acetoxyalkyl, phenylcarbamoyl and 2-mercapto-4,4,6-trimethyl-1[4H]pyrimidinyl.

Illustrative symmetrical disulfides which may be prepared by the process of this invention are:

2,2'-dithiobis(4-methylthiazole), 2,2'-dithiobis(4-methylbenzothiazole), 2,2'-dithiobis(naphthathiazole), 2,2'-dithiobis- (4-methyl-5-acetoxyethylthiazole), 2,2'-dithiobis(4,5,6,7-tetrahydrobenzothiazole), 2,2'-dithiobis(4-methyl-5-ethoxycarbonylthiazole), 2,2'-dithiobis(4-methyl-5-acetylthiazole), 2,2'-dithiobis-(4-methyl-5-phenylcarbamoylthiazole), 2,2'-dithiobis(benzimidazole), 2,2'-dithiobis(benzoxyazole), 2,2'-dithiobis(6-nitrobenzothiazole), 2,2'-dithiobis(5-chlorobenzothiazole), 2,2'-dithiobis-(6-ethoxybenzothiazole) and 2,2'-dithiobis(benzothiazole).

Illustrative asymmetrical disulfides which may be prepared by the process of this invention are:

2-(Methyldithio)benzothiazole, 2-(ethyldithio)benzothiazole, 2-(t-butyldithio)benzothiazole, 2-(phenyldithio)benzothiazole, 2-(tolyldithio)benzothiazole, 2-(octyldithio)benzothiazole, 6-nitro-2-(cyclohexyldithio)benzothiazole, 5-chloro-2-(benzyldithio)benzothiazole, 4-methyl-2-(phenyldithio)thiazole, 2(isopropyldithio)benzimidazole, and 2-(n-hexyldithio)benzoxazole.

Benzoyl 2-benzothiazolyl disulfide, benzoyl 6-nitro-2-benzothiazolyl disulfide, benzoyl 4-methyl-2-thiazolyl disulfide, benzoyl 2-benzoxazolyl disulfide, acetyl 2-benzothiazolyl disulfide, acetyl 5-chloro-2-benzothiazolyl disulfide, acetyl 4,5-dimethyl-2-thiazolyl disulfide, acetyl 2-benzoxazolyl disulfide, 0,0'-diisopropylphosphorotrithioyl 2-benzothiazole, 0,0'-di-n-butylphosphorotrithioyl 2-benzothiazole, 0,0'-dibenzylphosphorotrithioyl 2-benzoxazole, 0,0'-dimethylphosphorotrithioyl 2-benzothiazole, 0,0'-dipropylphosphorotrithioyl 6-nitro-2-benzothiazole, and 0,0'-diethylphosphorotrithioyl 4-methyl-2-thiazole.

The reaction takes place in the presence or absence of solvent. However, it is convenient, although not essential, to carry out the reaction in an inert solvent and to select one in which one of the products is insoluble because separation and recovery of the product is thereby made easier. Also the precipitation of one of the products serves as a driving force for the reaction which results in complete conversion of reactants and high yield of polysulfide. The recovered imide may be converted to a thioimide and reused. Solvents suitable for carrying out the process are water, carbon tetrachloride, ether, acetone, alcohol, aliphatic hydrocarbon solvent such as heptane or aromatic hydrocarbon solvent such as benzene or toluene.

Another feature of this process is that it can be conducted at moderate temperature. In fact, room temperature is sufficient. Generally, the reaction is conducted between 20–100°C. The optimum temperature is determined by a number of factors such as reaction rate, boiling point of the solvent used, solubility of reactants or products, or stability of the products. In certain cases, higher reaction temperature may be used when the products are sufficiently stable.

The following specific embodiments are illustrative of the wide variety of disulfides which are produced via this process.

DESCRIPTION OF PREFERRED EMBODIMENTS

EXAMPLE 1

2-(CYCLOHEXYLDITHIO)BENZOTHIAZOLE 0.85 Grams (0.005 moles) of 2-mercaptobenzothiazole are added to 1.3 grams (0.005 moles) of N-(cyclohexylthio)phthalimide in 65 ml of benzene at 40°–45°C. The reaction mixture is stirred between ½–1 hour after which the phthalimide is removed by filtration. After part of the benzene is evaporated under nitrogen, the mixture is filtered again to remove more phthalimide. The benzene solution is the extracted with dilute sodium hydroxide and the extract is washed with water. After drying over sodium sulfate, the remaining benzene is removed by evaporation. The residue is substantially pure 2-(cyclohexyldithio)benzothiazole. Elemental analysis of the product gives 4.86% nitrogen compared to 4.98% nitrogen calculated for $C_{13}H_{15}NS_3$.

EXAMPLE 2

N-(cyclohexylthio)phthalimide and mercapto-azole are refluxed in 150–300 ml of isopropanol in equimolar amounts for 3 hours. The mixture is stirred at 25°–30°C for 18 hours. A quantity of dilute sodium hydroxide solution in excess of the amount required to convert all the phthalimide by-product to the sodium salt is added and the mixture stirred for one-half hour. For liquid products, the disulfide is extracted with 500–600 ml of ether, washed with water until neutral to litmus, dried over $NaSO_4$ and the disulfide recovered by evaporation of the ether at 80°–90°C and 1 –2 mm Hg. For solid products, the disulfides are recovered by filtration, washed with water and dried at 25°–30°C. The cyclohexyldithioazoles prepared in this manner are shown in Table I. Identification of the disulfides is confirmed by NMR spectral analysis.

TABLE 1

$Y-S-S-C_6H_{11}$

| Y | Melting point, °C. | Yield, percent | Percent N Theo. | Percent N Fd. | Percent S Theo. | Percent S Fd. |
|---|---|---|---|---|---|---|
| HC–S, CH₃–C–N (C–) | Amber liquid | 84 | 5.71 | 5.54 | 39.18 | 39.40 |
| benzothiazolyl with CH₃ | Vis. oil | 87 | 4.74 | 4.52 | 32.55 | 32.72 |
| naphthothiazolyl | ...do... | 86 | 4.22 | 4.10 | 29.01 | 29.30 |
| CH₃–C(O)–O(CH₂)₂–C–S, CH₃–C–N (C–) | ...do... | 68 | 4.23 | 4.37 | 29.02 | 28.87 |
| tetrahydrobenzothiazolyl | ...do... | 65 | 4.91 | 4.79 | 33.69 | 33.95 |
| C₂H₅O–C(O)–C–S, CH₃–C–N (C–) | ...do... | 65 | 4.41 | 4.19 | 30.30 | 30.65 |
| CH₃–C(O)–C–S, CH₃–C–N (C–) | ...do... | 80 | 4.87 | 4.89 | 33.46 | 33.87 |
| benzo C=N, N–C=N | Vis. semi-solid | 51 | 13.07 | 12.74 | 29.92 | 30.00 |
| C₆H₅NH–C(O)–C–S, CH₃–C–N (C–) | 112-113 [a] | 92 | 7.69 | 7.37 | 26.39 | 25.90 |
| (CH₃)₂C(NH)–CH–C(CH₃)=N–(benzothiazolyl) | 189-190 [b] | 90 | 9.69 | 9.74 | 29.44 | 29.47 |

TABLE I—Continued

Y—S—S—C₆H₁₁

| Y | Melting point, °C. | Yield, percent | Percent N Theo. | Percent N Fd. | Percent S Theo. | Percent S Fd. |
|---|---|---|---|---|---|---|
| benzothiazol-2-yl (NH) | 133–134 | 94 | 10.60 | 10.42 | 24.26 | 24.11 |
| 6-NO₂-benzothiazol-2-yl | 106 a | 77 | 8.58 | 8.33 | 29.47 | 29.67 | a Recrystallized from isopropanol.
b Recrystallized from toluene.

EXAMPLE 3

An alternative procedure comprises dissolving N-(cyclohexylthio)phthalimide in benzene, warming to 75°C and adding with stirring a 10 percent molar excess of mercapto-azole. The mixture is stirred for 18 hours, cooled to about 10°C and the phthalimide by-product removed by filtration. The mixture is washed with dilute sodium hydroxide, dried over sodium sulfate, and the product recovered by evaporation of the benzene. The products are shown in Table II. Identification of the disulfides is confirmed by NMR spectral analysis.

TABLE II
Y—S—S—C₆H₁₁

| Y | Melting point, °C. | Yield, percent | Percent N Theo. | Percent N Fd. | Percent S Theo. | Percent S Fd. |
|---|---|---|---|---|---|---|
| 6-Cl-benzothiazol-2-yl | 67–68 | 79 | 4.44 | 4.62 | 30.40 | 30.17 |
| 6-C₂H₅O-benzothiazol-2-yl | Vis. oil | | 4.30 | 4.26 | 29.50 | 30.43 |
| benzoxazol-2-yl | Amber liquid. | 78 | 5.27 | 5.09 | 24.10 | 23.64 |

EXAMPLE 4

1,3-PROPYLENE BIS(PHENYLDISULFIDE)

2.7 Grams (0.025 mole) of 1,3-dimercaptopropane are added to 10.3 grams (0.025 mole) of N-phenylthiosuccinimide in 150 ml of benzene at room temperature (~25°C). After stirring for one hour, 4,9 grams of succinimide (m.p. 122°C) are recovered by filtration. Evaporation of the solvent gives an oil identified as 1,3-propylene bis(phenyl disulfide).

EXAMPLE 5

PHENYL DISULFIDE 5.5 Grams (0.05 mole) of thiophenol are stirred with 10.2 grams (0.05 mole) of N-(phenylthio)maleimide in 150 ml of benzene at room temperature for one hour. The benzene is removed from the reaction mixture by evaporation and the residue is added to 200 ml of methanol. A white solid forms upon contact with the methanol which is recovered by filtration. The solid recovered is 9.2 grams (84% yield) of phenyl disulfide. Recrystallized from methanol, the product melts sharply at 60°C.

EXAMPLE 6

2-(tert-BUTYLDITHIO)BENZOTHIAZOLE 11.8 Grams (0.05 mole) of N-(tert-butylthio)phthalimide and 8.5 grams (0.05 mole) of 2-mercaptobenzothiazole in 200 ml of benzene are stirred at 70°C for 6 hours. The reaction mixture is cooled and filtered to obtain 7.1 grams of phthalimide (white solid, m.p. 231°C). The benzene is stripped from the filtrate by evaporation to give a solid residue. The residue recrystallized from methanol gives 9.3 grams of 2-(tert-butyldithio)benzothiazole, m.p. 80.0°–80.5°C. Another 3.0 grams of product are obtained upon concentration of the alcoholic filtrate.

EXAMPLE 7

PHENYL DISULFIDE

This example illustrates that the disulfides may be prepared without the use of solvent. 12.1 Grams (0.11 mole) of thiophenol are added in one portion to 20.7 grams of N-phenylthio succinimide. The reaction container is blanketed with nitrogen to reduce the presence of moisture. The temperature of the reaction mixture rises from 23°C to 58°C. After stirring for 15 minutes, 400 ml of water (at 70°–75°C) are added and the mixture stirred 10 more minutes. The slurry is cooled and then filtered to recover 21.0 grams (96% yield) of phenyl disulfide. Recrystallized from methanol, the product melts at 59°C.

EXAMPLE 8

ALLYL PHENYL DISULFIDE 7.4 Grams (0.1 mole) of 2-propene-1-thiol(allyl mercaptan) are added to 20.0 grams (0.1 mole) of N-phenylthiosuccinimide in 300 ml of benzene and are stirred for 8 hours at room temperature. 8.5 Grams of succinimide (m.p. 123°–124°C) are recovered by filtration. The filtrate is washed with 0.1N sodium hydroxide and then with water. The washed filtrate is dried over sodium sulfate, filtered to remove the sodium sulfate and evaporated at reduced pressure to yield 17.0 grams of crude allyl phenyl disulfide. The crude allyl phenyl disulfide is distilled and 11.8 grams of pure product are collected at 75°–79°C and 0.5 mm Hg.

EXAMPLE 9

1,6-BIS PHENYL n-HEXYL DISULFIDE

This example illustrates the preparation of bis-alkyl disulfides. 1.12 Grams (0.01 mole) of thiophenol are added to 2.21 grams (0.005 moles) of 1,6-bis(N-thiophthalimido)-n-hexane in 80 ml of benzene. The reaction mixture is heated at 60°C for three hours and then allowed to cool and stand overnight at room temperature. The mixture is filtered to remove phthalimide. The filtrate is extracted with several 20 ml portions of 0.1N NaOH and then extracted with 20 ml of water. The benzene solution is filtered to remove traces of water and the benzene evaporated to yield an amber liquid identified by NMR analysis as 1,6-bis phenyl n-hexyl disulfide.

EXAMPLE 10

PHENYL-tert-OCTYL TRISULFIDE

This example and example 11 demonstrate the preparation of an unsymmetrical trisulfide by reacting a mercaptan and a dithiophthalimide.

0.561 Grams (0.005 mole) of thiophenol are added to 1.61 grams (0.005 mole) of N-tert-octyldithiophthalimide in 40 ml of benzene at 55°C and stirred for 4 hours. The reaction mixture is cooled to room temperature and is stirred overnight. Phthalimide is recovered from the mixture by filtration. The filtrate is washed with 0.1N NaOH and with water. The benzene is removed by evaporation. 1.42 Grams (99.5% yield) of phenyl-tert-octyl trisulfide (an amber liquid) are obtained. The product is identified by NMR analysis.

EXAMPLE 11

BENZYL-tert-OCTYL TRISULFIDE 0.372 Grams (0.003 mole) of benzyl mercaptan are added to 0.809 grams (0.0025 mole) of N-tert-octyldithiophthalimide in 25 ml of benzene. The reaction mixture is stirred for 48 hours at room temperature. The mixture is washed with 3 portions of 0.1N NaOH and one portion of water to remove the phthalimide and then is dried over sodium sulfate. The benzene is evaporated at room temperature to yield 0.752 grams of an amber oil (100% yield). Upon standing, solids (phthalimide) formed in the crude product. The product is extracted with petroleum ether leaving behind the solids. The ether is evaporated to recover the purified product. The product is identified by NMR analysis as benzyl-tert-octyl trisulfide.

EXAMPLE 12

6-NITRO-2-(ISOPROPYLDITHIO)BENZOTHIAZOLE

N-(Isopropylthio)phthalimide (3.18 g, 15 mmoles) is added to a solution of 6-nitro-2-mercaptobenzothiazole (3.5 g, 16.5 mmoles) in 40 ml of methanol and 250 ml of benzene at 58°–60°C. The mixture is stirred for 1.5 hours at 58°–60°C and overnight at room temperature. The mixture is evaporated to dryness and the residue slurried in warm benzene. By-product phthalimide is recovered by filtration. The filtrate is washed four times with 0.25 N sodium hydroxide and twice with water. Evaporation of the benzene gives 6-nitro-2-(isopropyldithio)benzothiazole, m.p. 78°–80°C recrystallized from heptane. Analyses give 9.89% nitrogen and 33.44% sulfur compared to 9.79% nitrogen and 33.60% sulfur calculated for $C_{10}H_{10}N_2O_2S_3$. Identification is confirmed by nuclear magnetic resonance spectral analysis.

EXAMPLE 13

6-NITRO-2(tert-BUTYLDITHIO)BENZOTHIAZOLE

N-(tert-Butylthio)phthalimide (23.5 g, 0.1 mole) and 6-nitro-2-mercaptobenzothiazole (23.7 g, 0.11 mole) in 200 ml of dimethylformamide are stirred at 80°–90°C for 24 hours. After cooling the mixture to room temperature, 32 grams of 25% NaOH (0.2 mole) and 700 ml of water are added. The mixture is cooled to 0°C stirred for one-half hour at 0°–10°C and the precipitate collected by filtration, washed with water until neutral and air dried at 25°–30°C. 6-Nitro-2-(tert-butyldithio)benzothiazole (27 g, 90% yield), m.p. 119°–120°C recrystallized from heptane is recovered. Analysis gives 43.96% C, 4.17% H, 9.34% N, 10.41% O and 32.54% S compared to 43.98% C, 4.02% H, 9.33% N, 10.65% O, and 32.02% S calculated for $C_{11}H_{12}N_2O_2S_3$.

EXAMPLE 14

6-NITRO-2-(PHENYLDITHIO)BENZOTHIAZOLE

N-(Phenylthio)phthalimide (0.15 mole) and 6-nitro-2-mercaptobenzothiazole in 300 ml of isopropanol reacted by the procedure of Example 2 give 6-nitro-2-(phenyldithio)benzothiazole, m.p. 105°–106°C recrystallized from alcohol. Analysis gives 48.72% C, 2.52% H, 8.74% N, 9.99% O and 30.02% S compared to 48.90% C, 2.48% H, 8.71% N, 10.10% O and 29.86% S calculated for $C_{13}H_8N_2O_2S_3$.

EXAMPLE 15

2-(ISOPROPYLDITHIO)BENZOTHIAZOLE

N-(Isopropylthio)phthalimide and 2-mercaptobenzothiazole reacted by the procedure of Example 3 give 2-(isopropyldithio)-benzothiazole in 88% yield. Identification is confirmed by NMR spectral analysis.

EXAMPLE 16

2-(BENZYLDITHIO)BENZOTHIAZOLE

N-(Benzylthio)phthalimide and 2-mercaptobenzothiazole reacted by the procedure of Example 3 give 2-(benzyldithio)benzothiazole, m.p. 63°C, in 82% yield. Identification is confirmed by NMR spectral analysis.

EXAMPLE 17

6-NITRO-2-(BENZYLDITHIO)-BENZOTHIAZOLE

N-(Benzylthio)phthalimide and 6-nitro-2-mercaptobenzothiazole reacted by the procedure of Example 3 give 6-nitro-2-(benzyldithio) benzothiazole, m.p. 129°–130°C, in 80% yield. Identification is confirmed by NMR spectral analysis.

EXAMPLE 18

BIS(2-BENZOTHIAZOLYL)DISULFIDE

N-(2-Benzothiazolylthio)phthalimide and 2-mercaptobenzothiazole reacted following the procedure of Example 2 give bis(2-benzothiazolyl) disulfide.

EXAMPLE 19

2-(CYCLOHEXYLDITHIO)BENZOTHIAZOLE

N-(2-Benzothiazolylthio)succinimide and cyclohexyl mercaptan reacted by the procedure of Example 2 give 2-(cyclohexyldithio)-benzothiazole.

EXAMPLE 20

1,2-BIS(2-BENZOTHIAZOLYLDITHIO)ETHANE

Two moles of N-(2-benzothiazolylthio)phthalimide and one mole of 1,2-dimercaptoethane reacted by the procedure of Example 2 give 1,2-bis(2-benzothiazolyldithio)ethane.

EXAMPLE 21

α,α'-BIS(2-BENZOTHIAZOLYLDITHIO)-p-XYLENE

Substituting one mole of α, α'-dimercapto-p-xylene in Example 20 gives α, α'-bis(2-benzothiazolyldithio)-p-xylene.

EXAMPLE 22

BENZOYLCYCLOHEXYL DISULFIDE 13.1 Grams (0.05 mole) of N-(cyclohexylthio)phthalimide and 6.9 grams (0.05 mole) of benzoyl thiol(thiobenzoic acid) in 150 ml of heptane are stirred overnight at room temperature. The precipitate is recovered by filtration, washed with carbon tetrachloride and dried. 7.3 Grams of phthalimide (m.p. 234°C) are obtained. The solvent is removed from the filtrate by evaporation under reduced pressure. 12 Grams (95% yield) of product, a light brown liquid, are obtained. The identity of the benzoylcyclohexyl disulfide is confirmed by GLC and NMR analyses. Analysis gives 25.51% sulfur compared to 25.45% sulfur calculated for $C_{13}H_{16}OS_2$. Similarly, except N (2-benzothiazolylthio)phthalimide is one reactant, there is obtained benzoyl-2-benzothiazolyl disulfide.

EXAMPLE 23

O,O'-DIETHYLCYCLOHEXYLTHIOPHOSPHORODITHIOATE 18.6 Grams (0.1 mole) of O,O'-diethyl-S-hydrogen phosphorodithioate are added to 26 grams (0.1 mole) of N-(cyclohexylthio) phthalimide in 300 ml of heptane at 70°C. After stirring for 2 hours at 70°C, 14.7 grams of phthalimide (white solid, m.p. 233°–234°C) are recovered by filtration. The filtrate is evaporated to yield 28.0 grams (93% yield) of a yellow liquid which is identified as the desired disulfide. Similarly, except N-(2-benzothiazolylthio) phthalimide is one reactant, there is obtained O,O'-diethylphosphorotrithioyl 2-benzothiazole.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or priviledge is claimed are defined as follows:

1. A process for the preparation of organic azole polysulfides which comprises reacting a compound Y'(SH)n' with a compound

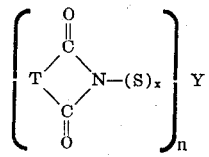

in which T is alkylene, cycloalkylene, alkenylene, cycloalkenylene, or arylene, and $n$, $n'$ and $x$ are one or two; when $n$ and $n'$ are one, Y' is azolyl, nuclear substituted azolyl, alkyl, cycloalkyl, aralkyl, alkenyl, aryl or alkaryl, Y is

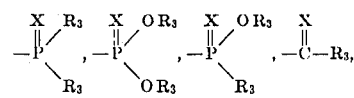

azolyl or nuclear substituted azolyl or —$R_3$ where $R_3$ is alkyl, cycloalkyl, aralkyl, alkenyl, aryl, or alkaryl, wherein X is oxygen or sulfur, and at least one of Y and Y' is azolyl or nuclear substituted azolyl in which the substituents are selected from the group consisting of halo, hydroxy, alkoxy, nitro, lower alkyl, acetyl, carboxyl, acetoxy, acetoxyalkyl, phenylcarbamoyl, and pyrimidinyl; when $n$ is two, $n'$ is one, and Y has the same meaning as T and Y' is azolyl or nuclear substituted azolyl as above, when $n'$ is two, $n$ is one and Y' has the same meaning as T and Y is azolyl or nuclear substituted azolyl as above.

2. The process of claim 1 in which the azolyl radical is selected from the group consisting of 2-benzothiazolyl, 2-benzoxazolyl, 2-benzimidazolyl, 2-thiazolyl, 2-thiazolinyl, 2-naphthathiazolyl, 2-(4,5,6,7-tetrahydrobenzothiazolyl and s-triazolo[3,4-b]benzothiazol-3-yl.

3. The process of claim 1 in which the azolyl radical is nuclear substituted.

4. The process of claim 1 in which the azolyl radical is arylene azolyl.

5. The process of claim 1 in which the azolyl radical is 2-benzothiazolyl.

6. The process of claim 1 in which $n$, $n'$ and $x$ are one.

7. The process of claim 1 in which the sum of $n$ and $n'$ is no more than three.

8. The process of claim 1 in which T is arylene.

9. The process of claim 1 in which $n$, $n'$ and $x$ are one and Y or Y' is alkyl, cycloalkyl, or aryl.

10. The process of claim 1 in which $n$, $n'$ and $x$ are one, Y or Y' is alkyl, cycloalkyl, or aryl and T is orthophenylene.

11. The process of claim 1 in which T is orthophenylene, $n$, $n'$ and $x$ are one and Y is cyclohexyl.

12. The process of claim 1 in which T is orthophenylene, $n$, $n'$ and $x$ are one and Y is phenyl.

13. The process of claim 1 in which

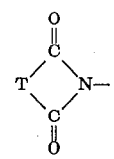

is selected from the group consisting of phthalimidyl, succinimidyl or maleimidyl.

14. The process of claim 1 in which

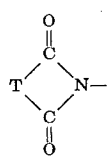

is phthalimidyl, succinimidyl, or maleimidyl and Y or Y' is alkyl, cycloalkyl or aryl.

15. The process of claim 1 in which $n$, $n'$ and $x$ are one, T is orthophenylene and y and Y' both are azolyl.

16. The process of claim 1 in which $n$, $n'$ and $x$ are one, T is orthophenylene and Y and Y' are 2-benzothiazolyl.

17. The process of claim 1 in which $n$, $n'$ and $x$ are one, Y is alkyl, cycloalkyl or aryl and Y' is 2-benzothiazolyl.

18. The process of claim 1 in which Y' is 2-benzothiazolyl and Y is

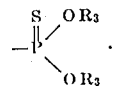

19. The process of claim 1 in which Y' is 2-benzothiazolyl and Y is

* * * * *